United States Patent [19]

Ponzellini

[11] Patent Number: 4,511,108
[45] Date of Patent: Apr. 16, 1985

[54] LOCKING DEVICE FOR THE ASSEMBLING OF MODULAR ELEMENTS OF PIECES OF FURNITURE

[75] Inventor: Giulio Ponzellini, Bologna, Italy
[73] Assignee: Castelli S.p.A., Bologna, Italy
[21] Appl. No.: 644,134
[22] Filed: Aug. 23, 1984

Related U.S. Application Data

[63] Continuation of Ser. No. 243,714, Mar. 16, 1981, abandoned.

[30] Foreign Application Priority Data

Mar. 18, 1980 [IT]  Italy ............................... 48194 A/80

[51] Int. Cl.³ ............................................. F16M 11/20
[52] U.S. Cl. .................................. 248/188.7; 403/369
[58] Field of Search ............... 248/188.7, 188.1, 188.4, 248/188.8; 411/531 US; 403/369

[56] References Cited

U.S. PATENT DOCUMENTS

| | | | |
|---|---|---|---|
| 2,102,901 | 12/1937 | Laursen | 411/531 |
| 3,236,485 | 2/1966 | Staples | 248/188.1 |
| 3,533,586 | 10/1970 | Chichester | 248/188.1 |
| 3,561,798 | 2/1971 | Redfern | 403/369 |
| 4,163,537 | 8/1979 | Mourgue | 248/188.1 |
| 4,178,858 | 12/1979 | Ponzellini | 248/188.7 X |

Primary Examiner—Ramon S. Britts
Assistant Examiner—Sarah A. Lechok
Attorney, Agent, or Firm—Murray Schaffer

[57] ABSTRACT

A column and a plurality of support members having radially extending arm and/or foot portions, having an inner end portion shaped as a sector of a cylinder with an axial Morse tapered hole, and adapted to be received in the inside of the hollow end portion of the column. A bolt is screwed in an axial threaded hole of a Morse tapered body made of metal, and with its head resting on the upper ends of said sector-like portions of the arm or foot members or on the lower ends of the sector-like portions of the foot members. The body is presented from rotary movement with respect to the arm or foot members and is permitted mutual axial movement with respect thereto to pressure the supports against the column.

6 Claims, 7 Drawing Figures

LOCKING DEVICE FOR THE ASSEMBLING OF MODULAR ELEMENTS OF PIECES OF FURNITURE

This is a continuation of U.S. Ser. No. 243,714, filed Mar. 16, 1981, now abandoned.

BACKGROUND OF THE INVENTION

The present invention relates to a columnar support for knock-down furniture and the like and particularly an expansion locking device to be used in supporting, for instance, a top plate of a disassemblable table, a shelf, a container or other disassemblable articles of furniture.

Locking devices for locking a plurality of radially outwardly directed arm or foot members to a vertical column are presently known.

The arm and/or foot members of known structures of one type are constructed so as to be made integral to each other with the connection of these members to the upper and/or lower end of the column being obtained by a screw or by means of bolts, screws or the like. This solution is inconvenient because the arm members as well as the foot members become heavy and thus difficult to handle. This causes difficulties in the assembly and disassembly operations, and may cause damage to the threaded portion of exposed bolts.

The arm and foot members of some structures according to a second type are constructed as independent bodies, which have to be fastened together to the one or the other end of a vertical column.

A solution to these problems has been proposed which employs a locking device, comprising clamping means arranged at the inner ends of the arm and foot members and which engages inside clamping seats provided at the ends of the column.

This solution requires that provision be made at the ends of the column which include as many clamping seats as is the number of the arm and foot members respectively. That causes a steep increase in the manufacturing cost. Additionally a very high dimensional accuracy between the cooperating clamping surfaces is required in order to prevent oscillations of the arm and foot members, which could produce the instability of the article of furniture and/or a non-perfect horizontal position of a table-top plate or a shelf or the like supported by the carrying structure.

According to a third solution the independent arm and foot members are connected to the respective end of a vertical column by means of an expansion locking device, acting from the inside on the inner sector-like ends of the arm and foot members. This device comprises at least a body adapted to uniformly enlarge itself in radial directions and which is made of an elastomeric material. The body is placed between two washers mounted on a threaded rod in such a manner that as the rod is caused to rotate, the washers are caused to approach to one another tightening the resilient body disposed therebetween. This causes the radial expansion of the body so that the same applies radial pressures on the sector-like elements along a zone placed inside the hollow end portions of the column. But such an elastomeric body, which is provided for ensuring the locking between the aforesaid parts, tends to lose its elasticity relatively quickly with consequent loss of locking action.

SUMMARY OF THE INVENTION

Accordingly, the present invention comprises a threaded bolt having an enlarged head which rests on the upper or lower parts respectively of the inner elements of a plurality of arm members and foot members. Parts of these members are shaped as sectors of the same cylinder having a partial axial conical hole. The sector-like elements are designed to be partially inserted inside the hollow ends of a vertical column so as to define together, in combination, a conical, tapered, hole. The tapered hole or bore receives the threaded bolt which is screwed in a conical body made of a rigid material, metal, for instance. The peripheral surface of the body and the conical tapered bore formed by joining the sector-like elements are each given complimentary Morse tapers so that by threading the bolt into the conical body the body is urged to advance into the conical hole. This causes the sector-like elements to be pressed against the inner surface of the column. On the outer surface of each sector-like element of each arm member, below its upper end, and on the outer surface of each sector-like element of each foot member over the lower end thereof there is placed a partial annular outer shoulder. A portion of each of the sector-like elements has an outer diameter equal to the outer diameter of the column, while the remaining portion has a diameter adapted to be fitted inside the said column, so that, as the locking device becomes operative, the respective washer urges the annular shoulder of the sector-like elements to abut against the upper and the lower edge respectively of the column. Means are provided in order to prevent any rotation of the body with respect to the sector-like elements of the arm and foot members respectively. The arm members and foot members may be in a number of "n" or less, when the sector-like elements are constructed with an annular amplitude or angulated positioning slightly less than 360°:n. When the number of arm members or foot members is less than "n" spacers are used to complete or fill-in the angle of 360°. These spacers are shaped as the inner sector-like elements of the arm or foot members.

The locking device of the present invention is simple, lightweight, and exhibits good operational life. A further advantage of the locking device of the present invention is the fact that only few parts are necessary for cooperating in the locking action. An important feature of the device of this invention is the absence of elastomeric bodies used in the locking action. These elastomeric bodies are easily damaged and readily plastically deforms, causing locking deficiencies and difficulties in the disassembling operations. The locking device of the present invention also has high efficiency since the locking action is due only to the particular configuration of the conical body in the form of a Morse's cone, cooperating with a complimentary configuration of the cavity designed to receive the body. This ensures a clamping effect similar to that of the mandrels on the tools.

These and other characteristics and advantages of the present invention will be better understood from the following specification of some embodiments of the expansion locking device shown in the accompanying drawings.

DESCRIPTION OF THE INVENTION

Figure 1:
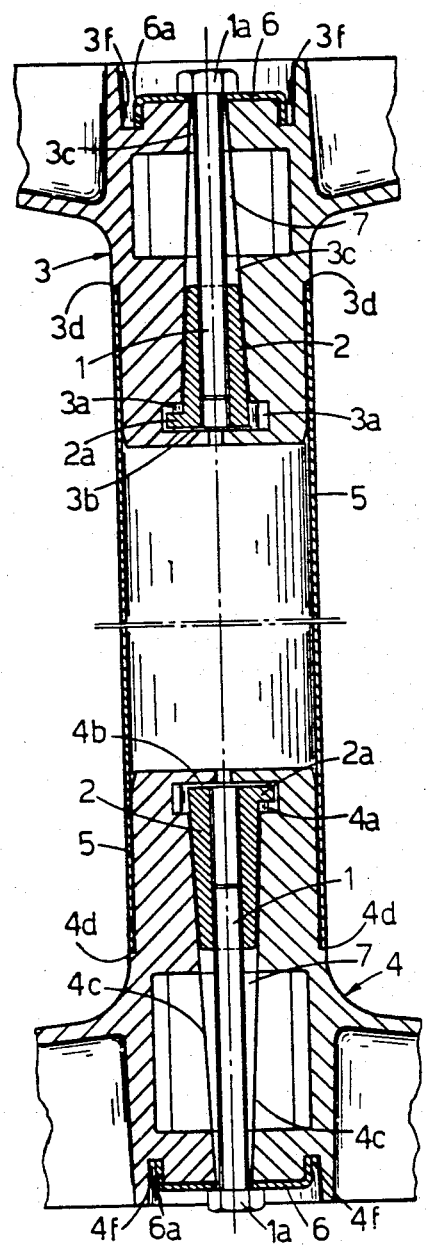
FIG. 1 is a partial axial section of the first embodiment of the locking device applied to a disassemblable or knock-down table, in which the carrying structure includes a single column, a plurality of arm members and a plurality of foot members, the outer portions of these latter having been broken away.
Figure 2:
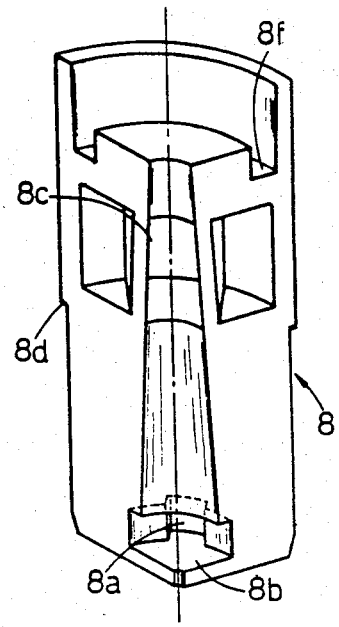
FIG. 2 is a perspective view of a spacer according to this invention.
Figure 3:
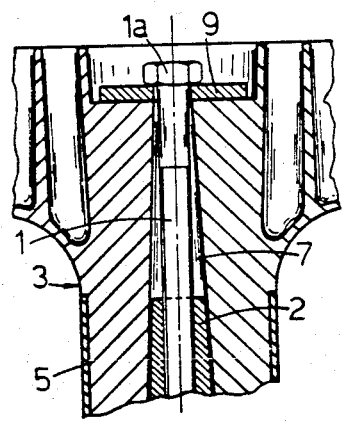
FIGS. 3 and 4 are the partial axial sections of two variants of the expansion locking device cooperating with the arm members.
Figure 4:
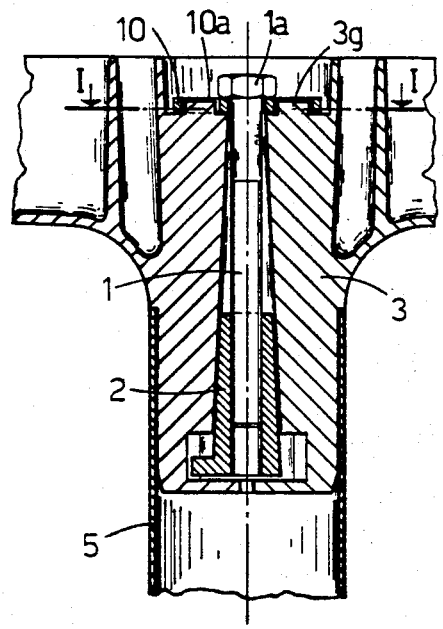
Figure 5A:
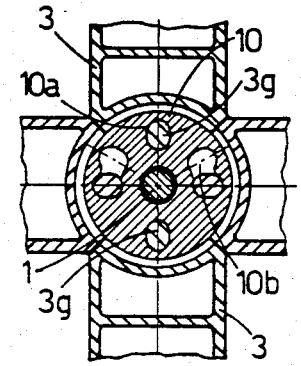
FIGS. 5a and 5b are cross sections similar to FIG. 5, when three and two arm members are employed together with the respective spacers.
Figure 5B:
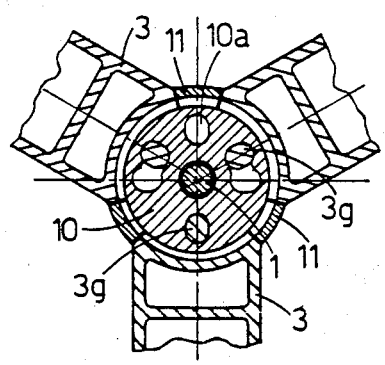
Figure 5C:
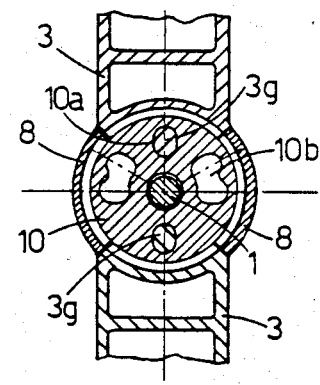
FIG. 5 is the horizontal cross section taken on the line I—I of FIG. 4.

Referring to the drawings a threaded bolt or rod is seen, having an enlarged head 1a. The inner end of the head is engaged in an axial threaded hole of a frustoconical body 2, made of a rigid material, in particular metal. The body 2 is shaped as a cone such as a Morse cone so that each generatrix thereof is set at an angle of about 3° to the longitudinal axis of said body 2, which also is the axis of a vertical column 5, at least the end portions of which are hollow. Arm members 3 and the foot members 4 are proned as parts for carrying the structure of a piece of furniture, as for instance, a disassemblable table. The inner end portions of the arm members 3 and foot members 4 are shaped as sector-like elements of a cylinder having a conical axial hole tapered as the outer side surface of the body 2. The parts of the sector-like end elements of each arm member 3 are indicated with the number 3 and are accompanied by a letter; accordingly the number 4, accompanied by the same letters for example, "a", will be used for indicating the operatively identical parts of the inner sector-like portions of the foot members 4. For this reason only the features of a sector-like element of an arm member 3 engaged in the upper hollow end of the column 5 will now be described. The inner sector-like element of each arm member 3 is provided with a hole in the form of a cone sector; each of the inner elements of the arm members 3 has an amplitude or angulated disposition of (360°:n)-a, where "n" in the shown embodiments is equal to 4, and "a" is a very small angle adapted to create a gap between the sector-like elements and the spacers 8 or 11. These spacers will be substituted for one or more of the sector-like elements in the event that only three, two or one arm members 3 are employed as when two or more carrying structures or columns are used in a piece of furniture. For example, in a disassemblable table, the table top plate might be supported by one, two or three of the columns 5 respectively. The gap must be sufficient to allow the inner sector-like elements to be pressure locked against the inner surface of the upper end portion of the column 5. On the outer surface of each sector-like element of each arm member 3, is an annular outer shoulder 3d. The shoulder is sized so that the upper portion of the sector-like element has an outer diameter equal to that of the column 5 while the remaining portion has a diameter adapted to be fitted inside the column 5. The annular shoulders 3c and those 8c of the optional spacers 8 or 11 together form an annular shoulder, by means of which the plurality of inner sector-like elements of the arm members 3 and spacers 8 or 11 abut against the upper edge of the column 5. A tooth 2a extends radially outwardly from the outer surface of the body 2, while a radial recess 3a is provided in the inner surface 3c of each sector-like element of each arm 3. The recess 3a are adapted to receive the tooth 2a, thus preventing any mutual rotation between the inner sector-like elements and the body 2, while the height or axial length of recess 3a is greater than the height of the tooth 2a so as to allow an axial displacement of the body 2 with respect to the sector-like elements. With this construction, the body 2 can approach the head 1a of the threaded bolt 1, as the latter is threaded into member 2, causing the body 2 to enter the cavity 7 and radially urge the inner sector-like elements of the arm members 3 (or of the spacers 8 or 11, as the case may be) against the inner surface of the column 5. According to the embodiment shown in FIG. 1, a washer 6 having a peripheral edge or skirt 6a bent downwardly 90° is mounted on the bolt 1 below its head 1a and rests on the bottom of a recess arranged at the upper part or planar annular flat of the inner sector-like elements of the arm members 3, and spacers 8 or 11. The recess have a depth such that the head 1a is placed below the level of the plurality of arm members 3, so that they can support the table top plate if these members are used in a disassemblable table. On the bottom of the recess in each sector-like elements there is provided a partial annular groove 3f which, together with the grooves 3f of other similar sector-like elements, forms an annular channel against the bottom of which abuts the washer edge 6a when the locking device is brought in its operative condition. In operation, as the rod or bolt 1 is threaded into conical body 2, this body is caused to enter the tapered cavity 7 whereupon radial pressures are applied on the sector-like elements to lock them against the inner surface of the upper end of the column 5. At the same time the washer 6 with its peripheral edge 6a presses the sector-like elements axially downwardly, so that the partial annular shoulders 3d forcingly abut against the upper edge of the column 5. It should be apparent that the plurality of the sector-like elements of the foot members 4, and the locking device cooperating therewith, are operatively identical to the above-described operation and so that they will not be described in detail here. Each spacer 8 of FIG. 2 is shaped like the inner sector-like elements of arm members 3 and foot members 4 so that corresponding parts of member 8, which are operatively identical to similar parts of the arm and foot members, are accompanied by similar letters. The embodiments shown in FIGS. 3 and 4 are variants of the preceding one. In particular, the washer in the variant of FIG. 3 is a simple disc 9 which transmits a pressure to the entire bottom of the recess, arranged in the upper part of the sector-like element of the arm members 3 or spacers 8. Since the bolt 1 is threaded into the conical body 2 in a manner noted above, the bolt is only partially shown in FIG. 3. In the variant of FIG. 4 the washer is a disc 10 through which are arranged a set of holes 10a and a set of twin holes 10b. The axes of these holes are equally spaced about the axis of the disc 10. The hole axes are angularly spaced from each other so that the holes 10a and/or 10b are each able to receive a tooth 3g having the same cross-sectional profile as that of each hole 10a or 10b. Each tooth 3g extends upwardly from the bottom portion of the partial recess or planar land arranged on each sector-like elements of the arm members 3. With this construction, the single plate or washer 10 having holes 10a, 10b can accommodate and ensure an exact positioning of the arm members 3, when, for example, each sector-like element has an angular amplitude or angulated position slightly less than 90°, and thus uses four arm members 3 (FIG. 5a). Or, this single plate 10 can accommodate three arm members 3 and three spacers 11 (FIG. 5b), or two arm members 3 and two spacers 8 (FIG. 5c).

I claim:

1. In a standard or support for furniture comprising a column which is hollow at least at its ends; a plurality of independent radial arm members and a plurality of independent radial foot members, each of said arm and foot members defining discrete, unitary elements, and having an inner end portion in the form of a sector of a cylinder having a tapered axial hole and being adapted to be partially received in the inside of the hollow end portion of the column together with other sector-like elements, a locking device for each of said arm and foot members, said locking device comprising a threaded bolt having an enlarged head including a washer resting on the upper ends of the inner sector-like elements of the arm members or on the lower ends of the inner sector-like elements of the foot members respectively, each sector-like element having an outer annular partial shoulder by means of which said sector-like elements of the arm members and foot members abut against the upper or lower end of the column respectively, said bolt being screwed at its inner portion in an axial threaded hole of a rigid frusto-conical body having its greatest base towards the inner portion of this bolt, said tapered hole being formed by the axial hole sectors of the inner sector-like elements of the arm members and foot members respectively being tapered to correspond to the outer surface of the body, and means for preventing any rotary movement of the body with respect to the arm or foot members, but enabling the body to move axially to and from the head along the bolt cooperating therewith as the bolt is screwed.

2. A locking device according to claim 1, wherein the means for preventing rotary movement of the body with respect to the arm members or foot members comprises a tooth extending outwardly radially from the body, and a partial annular coaxial recess arranged in the inner surface of the inner sector-like elements of the arm and foot members near their inner ends, each recess being provided substantially at the same level as that of the tooth, and having in plan a shape adapted to receive the tooth, but its height being greater than that of the tooth so as to enable axial movements of the body up to its locking position with respect to the sector-like elements locked by the locking device, and wherein at the upper part of each of the sector-like elements of the arm and foot members and of the spacers a partial sector-like recess is provided, adapted to form in combination a recess to house the washer as well as the bolt head.

3. A locking device according to claim 1, wherein the washer has a peripheral edge bent by 90 degrees with respect to the washer plane, and wherein on the bottom of said recess a partial annular groove is arranged so as to define, together with the other grooves, an annular channel to receive the peripheral washer edge.

4. A locking device according to claim 1, wherein the washer has the form of a disc.

5. A locking device according to claim 1, wherein the washer is a disc which is provided with single through holes and or twin holes having axes equally spaced apart from the washer axis, said axes being angularly spaced apart to each other so that each hole is able to receive a vertical complementary tooth extending outwardly from the bottom of the recess arranged in the sector-like elements of the arm and foot members, so as to duly position the arm or foot members according to the numbers of arm and foot members used in a carrying structure, with the inteposition of the necessary spacers.

6. A locking device according to claim 1, wherein the carrying structure is that of a disassemblable table, the table top of which is supported by at least one such carrying structure.

* * * * *